United States Patent [19]
Herbenar et al.

[11] 3,813,178
[45] May 28, 1974

[54] WEAR INDICATING JOINT

[75] Inventors: Edward J. Herbenar, Detroit; Kenneth R. Pozolo, Roseville, both of Mich.

[73] Assignee: TRW, Inc., Cleveland, Ohio

[22] Filed: Aug. 10, 1972

[21] Appl. No.: 279,481

[52] U.S. Cl. .................................. 403/27, 403/138
[51] Int. Cl. ............................................. F16c 11/06
[58] Field of Search ............. 287/87, 90 R, 90 C, 12, 287/21; 188/1 A; 403/27, 138, 144

[56] References Cited
UNITED STATES PATENTS

| | | | |
|---|---|---|---|
| 1,643,720 | 9/1927 | McKone | 287/87 X |
| 2,757,029 | 7/1956 | Latzen | 287/90 R |
| 3,103,377 | 9/1963 | Scheublein, Jr. et al. | 287/90 R |
| 3,226,142 | 12/1965 | Herbenar | 287/87 |
| 3,282,602 | 11/1966 | Willingshofer et al. | 403/76 X |
| 3,298,466 | 1/1967 | Ayers, Jr. et al. | 188/1 A |
| 3,423,114 | 11/1969 | Gottschald | 287/90 C X |
| 3,667,789 | 6/1972 | McNeeley et al. | 287/87 |

FOREIGN PATENTS OR APPLICATIONS

| | | | |
|---|---|---|---|
| 627,578 | 6/1927 | France | 287/90 R |
| 423,087 | 1/1935 | Great Britain | 287/90 C |
| 321,761 | 11/1929 | Great Britain | 287/21 |
| 456,942 | 11/1936 | Great Britain | 403/138 |

*Primary Examiner*—Andrew V. Kundrat
*Attorney, Agent, or Firm*—Hill, Gross, Simpson, Van Santen, Steadman, Chiara & Simpson

[57] ABSTRACT

A ball and socket joint for automotive wheel suspensions and steering linkages having an externally visible indicator showing wear of the joint components to facilitate inspection for determining when the joint should be replaced.

4 Claims, 6 Drawing Figures

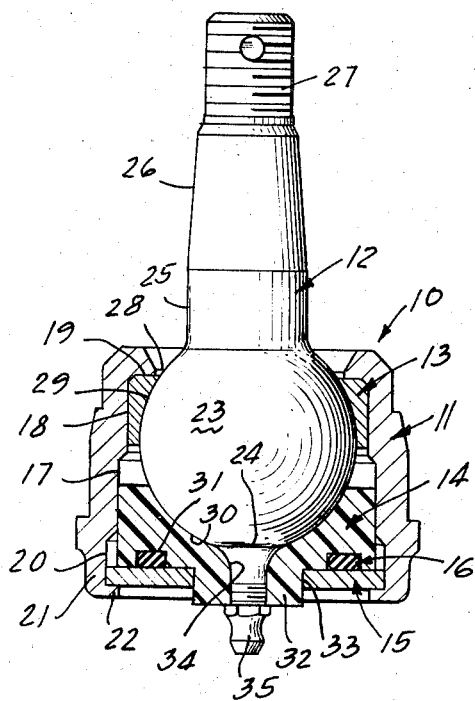
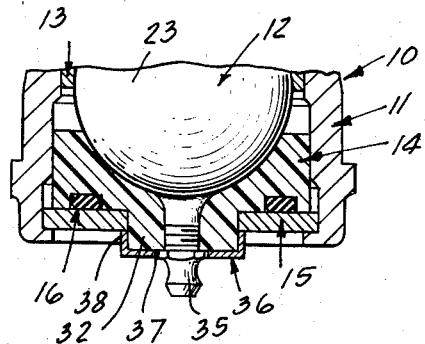
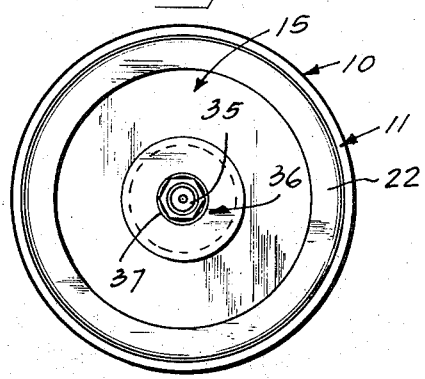
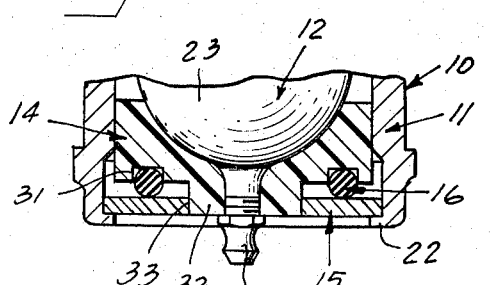
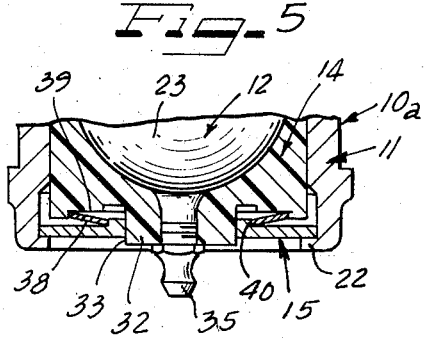

3,813,178

WEAR INDICATING JOINT

FIELD OF THE INVENTION

This invention pertains to the art of wear indicators for articulating assemblies such as ball joints and particularly deals with ball and socket joints for automotive wheel suspension and steering linkages which have external visual indicators showing the amount of wear of the joint components to facilitate inspection for replacement of worn joints before they are sufficiently worn out to create a hazard.

DESCRIPTION OF THE PRIOR ART

Heretofore, inspection of ball joints in automotive steering linkages and wheel suspensions involved rather haphazard manual shaking of the arms or linkages connected by the joints. If little or no looseness was detected, the linkages passed inspection. This inspection system failed to detect joints that would be worn out before a next scheduled inspection, frequently overlooked worn out joints because of apparent tightness created by other components in the linkage and, of course, since the test was based on "feel," judgement errors were quite high.

SUMMARY OF THE INVENTION

This invention now eliminates judgement errors in joint inspections and for the first time provides a visual indicator showing when a joint is about to develop looseness.

According to this invention the ball end of a ball stud is supported in a joint housing or socket on a load-carrying bearing ring or cup. A wear take-up bearing ring or cup slidable in the housing is urged against the ball end of the stud by spring means. This wear take-up bearing has a protrusion extending through an aperture in the closure plate for the housing. The degree of projection of this protrusion portion beyond the closure plate indicates the position of the wear take-up bearing in the housing and since the spring means continually urges the wear take-up bearing against the ball, wear of the bearing or the ball permits the spring to move the bearing further into the housing decreasing the projection distance of the protrusion portion of the bearing. Thus the level of the end of the protrusion relative to the closure plate gives an immediate visual inspection of the degree of wear of the bearing or the ball from outside of the housing.

In a preferred embodiment the protrusion can receive a pressed-on cap bottomed on the closure plate and when the protrusion recedes into the housing the cap will fall off and give an immediate indication that the joint should be replaced. The cap and protrusion may have contrasting colors. For example, the protrusion may be colored red and the cap colored green.

The protrusion may serve a dual function of carrying a lubricant fitting and the wear take-up spring may be in the form of a rubber O-ring serving the dual function of spring and seal.

The joint components are preloaded in the housing by pressing the closure plate into the housing against the wear take-up bearing thus flattening the spring and providing a direct relationship with regard to the degree of projection of the protrusion portion of the bearing and the closure plate. Wear of the internal joint components will result in movement of the wear take-up bearing away from the closure plate by action of the spring and the amount of wear can be gauged by the relationship of the members with set specifications being provided to indicate when the joint should be replaced.

It is then an object of this invention to provide a ball and socket joint with an externally readable wear indicator.

Another object of the invention is to provide visual inspection means on ball and socket joints showing when the joints should be replaced.

Another object of the invention is to provide ball and socket joints for automotive steering linkages and wheel suspensions with wear take-up bearings having protrusions visible from outside of the socket and indicating when the joints should be replaced.

A specific object of the invention is to provide a ball and socket joint with a ball stud having its ball end supported in a bearing ring and held therein by a spring urged wear take-up bearing ring having a projection visible from outside of the housing to show when the joint components are worn.

Another specific object of the invention is to provide a ball and socket joint assembly with a wear take-up bearing having a protrusion through the closure plug of the joint housing receiving a cap that will fall off of the protrusion when the joint components are worn to a condition where the joint should be replaced.

Other and further objects of this invention will become apparent to those skilled in this art from the following detailed description of the annexed sheet of drawings which show a preferred embodiment of the invention.

BRIEF DESCRIPTION OF THE DRAWING

FIG. 1 is a vertical cross sectional view, with parts in elevation, of a ball and socket joint equipped with a wear indicator according to this invention and showing the relative positions of the components when the joint is new;

FIG. 2 is a partial view similar to FIG. 1 but showing an embodiment of the invention including a snap-on cap;

FIG. 3 is a bottom plan view of the assembly of FIG. 2;

FIG. 4 is a partial view similar to FIGS. 1 and 2 but showing the positions of the components when the joint is worn; and FIG. 5 is a view similar to FIG. 4 showing an embodiment with a modified spring; and FIG. 6 is a view similar to FIG. 5 showing an embodiment with a wear take-up bearing having an integral spring.

BRIEF DESCRIPTION OF THE PREFERRED EMBODIMENTS

The ball and socket joint 10 of FIGS. 1 to 4 has a forged metal generally cylindrical housing 11, a ball stud 12, a load-carrying bearing ring 13, a wear take-up bearing ring 14, a closure plate 15 in the bottom of the housing, and a wear take-up rubber spring ring 16.

The housing 11 has a cylindrical bore 17 slidably supporting the wear take-up bearing 14, a smaller diameter bore 18 tightly receiving the bearing 13, an inturned shoulder 19 bottoming the bearing 13 in the bore 18, and an enlarged counterbore 20 below the bore 17 receiving the closure disk 15. As shown, the shoulder between the bores 17 and 18 limits the extent of sliding of the bearing 14 in the bore 17. The rim portion 21 of the housing surrounding the counterbore 20 is radially deformable and has a lip portion 22 spun over the periphery of the closure plate 15 for a purpose to be hereinafter more fully explained.

The ball stud 12 has a substantially complete spherical ball end 23 with a flat bottom 24 and a cylindrical shank 25 projecting from the end of the ball opposite the bottom 24 to a tapered shank portion 26 which converges to an externally threaded cylindrical end 27. The top end of the housing 11 has a circular opening 28 surrounded by the inturned shoulder 19 and sufficiently large so that the top portion of the ball 23 may project therethrough and the cylindrical shank portion 25 may have ample operating space so that the ball stud 12 can tilt through a relatively wide angle relative to the housing 11.

The bearing 13 is composed of rigid wear-resisting material such as metal or plastic and has a fragmental spherical or toroidal internal bearing wall 29 receiving the upper portion of the ball 23 thereby supporting the stud 12 for rotation and tilting movements.

The wear take-up bearing 14 has a fragmental spherical or toroidal internal bearing wall 30 receiving the bottom portion of the ball 23. The bottom wall of the bearing 14 has an annular groove 31 receiving the rubber spring ring 16. The bearing 14 is preferably composed of a plastic material having some shock absorbing or resilient characteristics such as a fluorocarbon resin, nylon, a polyolefin, or the like. Alternately, of course, the bearing 14 can be made of metal such as steel.

The bearing 14 has a cylindrical protrusion 32 projecting from the central portion of the bottom wall thereof through a circular aperture 33 in the closure plate 15. A hole 34 extends through this protrusion 32 registering with the flat bottom 24 of the ball end 23 and a lubricant fitting 35 is threaded into the bottom of this hole to supply lubricant to the bearing surfaces of the bearings and ball end of the stud.

In assembling the joint components the bearing ring 13 is first inserted in the bore 18, the stud shank is dropped through the bearing ring 13 with the adjacent portion of the ball 23 riding on the bearing wall 29. Then the wear take-up bearing 14 is inserted in the housing bore 17, the rubber spring ring 16 is seated in the groove 23, and the closure plate 15 is placed in the counterbore 20. The assembled components are then preloaded in the housing by applying an axial load to the closure disk 15. This load on the closure disk 15 causes it to assume a level in the counterbore 23 for sustaining the load and the position of the closure disk under this load in the counterbore will vary depending on the stacked height of the components under this load. Then the deformable portion 21 of the housing surrounding the closure disk is radially contracted and the lip 22 is spun over the periphery of the closure disk, all is more fully illustrated and described in the U.S. Pat. of E. J. Herbenar, No. 3,395,441, issued Aug. 6, 1968.

With the components assembled under the desired preload in the housing 11, the closure disk 15 flattens the rubber spring 16 into the groove 31 and is bottomed on the wear take-up bearing ring 14. Under these conditions the protrusion 32 projects beyond the bottom face of the closure disk as shown in FIG. 1. For ease in reading, the protrusion 32 or all of the bearing 14, can be colored red or some other attention-commanding color.

If desired, and as shown in FIG. 2, the projecting portion of the protrusion 32 can receive a pressed-on or snap-fit metal or plastic cap 36 with an aperture 37 freely receiving the lubricant fitting 35 and a skirt 38 embracing the periphery of the projecting part of the protrusion 32 and bottomed on the closure disk 15.

As wear develops between the ball 23 and the bearing rings 13 and 14, the spring 16 will urge the bearing ring 14 upwardly in the housing until the spring is completely expanded as shown in FIG. 4, or further inward movement of the bearing ring 14 is stopped by the shoulder between the bores 17 and 18. In this condition the protrusion 32 is flush with the closure disk 15 and of course it will be at once noticed that the joint has reached a worn-out condition. However, before this condition has been reached the retraction of the protrusion 32 into the hole 33 of the closure disk 15 will have released the cap 36 from the projecting portion of the protrusion because the cap is bottomed on the closure disk 15 as shown in FIG. 2. When the cap 36 drops off of the protrusion 32 the attention-commanding color of this protrusion is easily noted. The cap 36 could be colored a contrasting color such as green.

The rubber spring 16 serves as a seal preventing ingress of dirt into the joint housing 11 and also preventing egress of lubricant. If desired, the bearings 13 and 14 can be grooved in their bearing faces 29 and 30 thereof to distribute lubricant from the fitting 35 over the entire mating bearing surfaces.

The rubber spring 16 may be replaced with a metal spring in the embodiment 10a of FIG. 5. As there shown a metal Belleville spring or conical washer 38 has its outer periphery seated in a recess 39 in the bottom wall of a wear take-up bearing 14a and its inner periphery surrounds a shoulder 40 on the closure plate 15a. This washer spring 38 provides for the wear take-up movement of the bearing 14a in the same manner as the rubber spring 16.

The wear take-up bearing may have an integral spring as shown in the embodiment 10b of FIG. 6 where a wear take-up bearing 14b, similar to the bearings 14 and 14a, has an integral conical skirt 41 fitting freely in the housing counterbore 20 of the housing 11 and bottomed on the closure plate 15. A protrusion 42, the same as 32 of the bearings 14 and 14a, extends through the hole 33 of the closure plate. A bearing cup portion 43 receives the lower end of the ball 23 and is grooved in its bearing face to carry lubricant from the fitting 35. The plastic material of the bearing 14b is resilient, at least in the skirt portion 41 thereof, and when this conical skirt 41 is flattened by the plate 15 it will tend to reclaim its inclined conical free state. This urges the bearing cup 43 against the ball 23 and takes up wear. As in the other modifications, when the protrusion 42 is flush with the plate 15 or when it retracts sufficiently to discharge a cap (not shown) pressed thereon, a visual indication is given of the wear in the joint so that it may be replaced before becoming hazardous.

From the above descriptions it will of course be understood that this invention provides easily readable wear indicators for joint constructions eliminating the heretofore required guess-work in checking the condition of ball joints and the like in automotive steering and wheel suspension linkages.

We claim as our invention:

1. A joint construction comprising a housing, a stud member projecting from the housing, bearing means supporting the stud member in the housing, wear take-up means shifting the bearing means to compensate for wear of the bearing means and stud member, said wear take-up means being a conical skirt integral with said bearing means, and a protrusion on said bearing means projecting from the housing to show the degree of wear.

2. In a joint construction having a housing, a joint part projecting into the housing, bearing means in the housing supporting said joint part for movement relative to the housing, said bearing means including a movable wearable take-up part seated on said joint part and means biasing said wearable bearing parts against said joint part to maintain the bearing means in bearing engagement with said joint part, the improvements of, said housing having an apertured portion providing an external face, an externally visible wear indicator on said wearable bearing part projecting through the aperture of said portion beyond said external face, a cap mounted on the projecting portion of said wear indicator, said biasing means in the housing acting upon said wearable bearing part to retract the projecting portion of the wear indicator into the housing to release the cap when wear develops between the joint part and the bearing means beyond an acceptable level.

3. The joint construction of claim 2 wherein the releasable cap engages the external face of the apertured portion of the housing upon retraction of the projecting portion of the wear indicator into the housing for ejection of the cap to show the worn condition of the joint components in the housing.

4. A ball and socket joint which comprises a housing, a ball stud having a ball end in the housing and a shank extending from said ball end beyond said housing, a load carrying bearing in the housing surrounding the ball end of the stud adjacent the shank, a wear take-up bearing in the housing surrounding the free end of the ball end of the stud, a spring urging the wear take-up bearing toward the load-carrying bearing, a protrusion on the wear take-up bearing, said housing having a counterbore and an inturned lip on the end of the housing underlying said counterbore, an apertured closure disk slidable in said counterbore in the housing and pressed against the spring by said lip to a predetermined degree and having an exposed visible outer face surrounding the aperture thereof providing a fixed reference surface for the joint, said protrusion having an end projecting through the aperture of said closure disk beyond said face in an amount readable outside of the housing from the fixed reference surface to show acceptable wear of the joint components in the housing and said loaded spring retracting said protrusion with the end of the protrusion close to said reference surface to show unacceptable worn conditions of the joint components in the housing thereby providing a visual wear indicator for the joint parts.

* * * * *